Oct. 7, 1930.  W. J. KENT  1,777,313
TRIMMING MACHINE
Filed Oct. 28, 1927   2 Sheets-Sheet 1

INVENTOR
William J. Kent
BY
Ernest Hopkinson
ATTORNEY

Oct. 7, 1930.    W. J. KENT    1,777,313
TRIMMING MACHINE
Filed Oct. 28, 1927    2 Sheets-Sheet 2
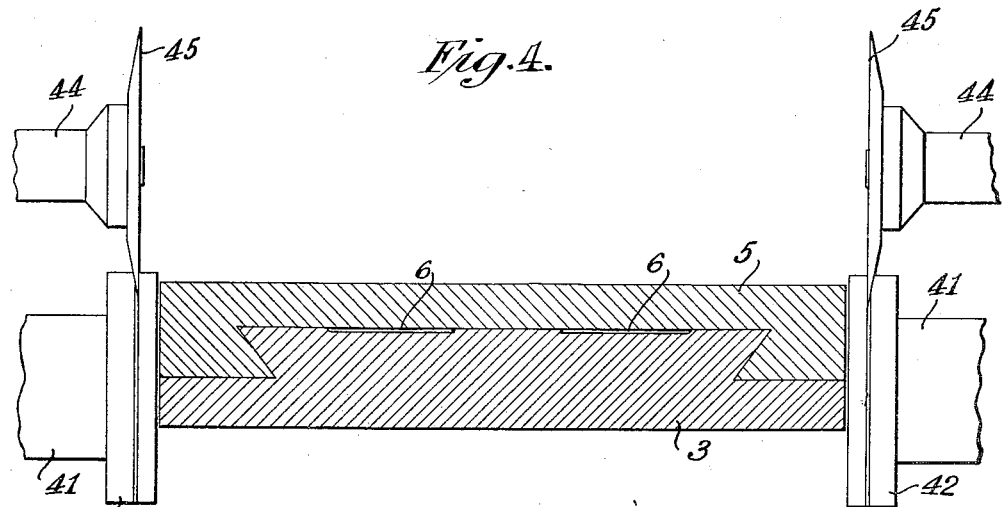
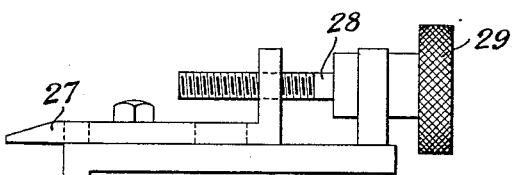
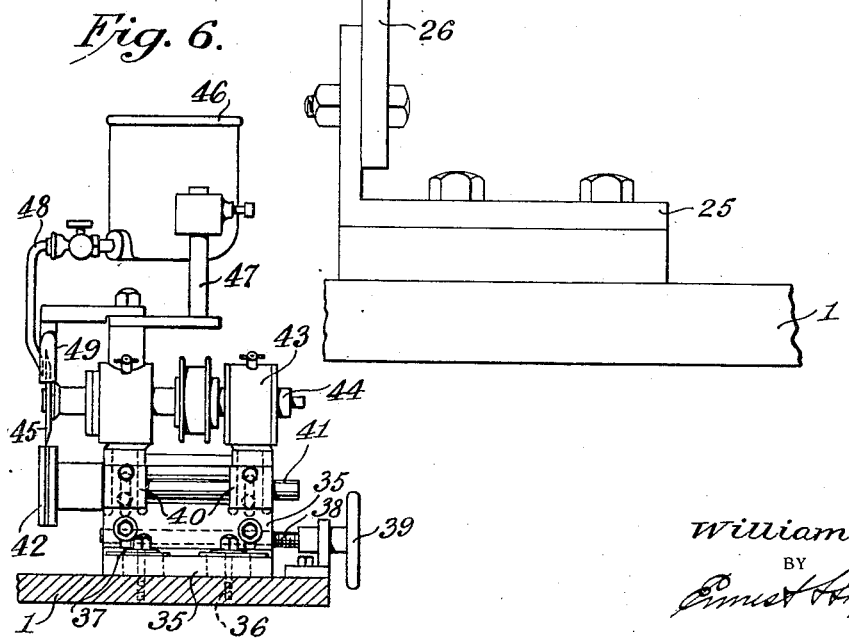
INVENTOR
William J. Kent
BY
Ernest H. Johnson
ATTORNEY Patented Oct. 7, 1930

1,777,313

UNITED STATES PATENT OFFICE

WILLIAM J. KENT, OF BROOKLYN, NEW YORK, ASSIGNOR TO THE MECHANICAL RUBBER COMPANY, OF CHICAGO, ILLINOIS, A CORPORATION OF NEW JERSEY

TRIMMING MACHINE

Application filed October 28, 1927. Serial No. 229,321.

This invention relates to a device for severing sheet material. More particularly it relates to a device for trimming slabs of rubber composition.

In machines customarily used in trimming rubber slabs, it has been necessary for the operator to grip the article by manually applied pressure. It has also been necessary for the operator to manually guide the article through the severing machine. These devices have required the exercise of considerable skill, time and close attention upon the part of the operator, particularly when the article must be trimmed accurately to size.

It is an object of this invention to provide a device for mechanically maintaining an article clamped in position. It is a further object to provide a means for mechanically guiding an article through the cutting means. Another object is to provide a cutting machine in which articles can be positioned accurately with a minimum of attention on the part of the operator.

Other objects will be apparent from the specification and from the accompanying drawings, in which latter:

Fig. 4 is a section upon the line 4—4 of Fig. 1;

Fig. 5 is a side elevation greatly enlarged of a gauge; and

Fig. 6 is a section along the line 6—6 of Fig. 1.

Figure 1:
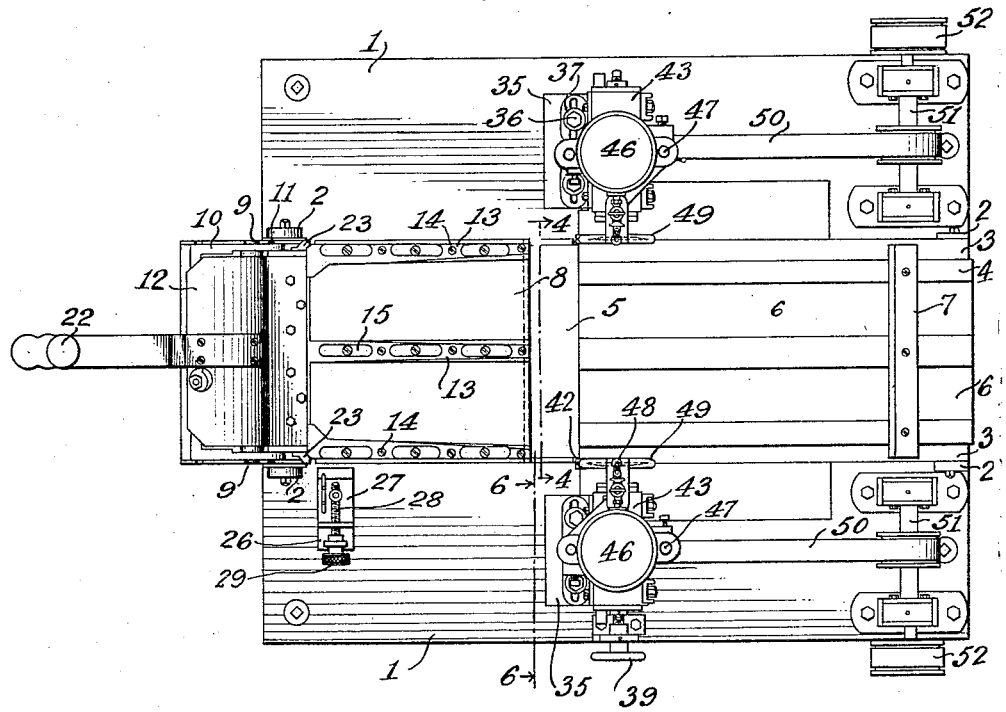
Fig. 1 is a top plan view of the machine.

Referring particularly to the drawings, in its preferred embodiment the device comprises a main supporting frame 1 which carries rigidly the bracket arms 2. Arms 2 support rigidly a table 3. Table 3 is provided upon its upper surface with a projection or rib 4 substantially coextensive with its length. The rib 4 is provided with overhanging side walls and constitutes a runway for the grooved bed plate 5 which has close interfit therewith. Spaced recesses 6 are provided in the upper surface of the projection 4, thereby minimizing the amount of surface in engagement with the bed plate 5 and at the same time presenting a reservoir for lubricant which can be carried in the recesses 6. The amount of sliding movement of the bed plate 5 with respect to the table 3 is limited by means of stops 7 which are rigidly affixed to the table 3 at opposite ends thereof.

The bed plate 5 and a pressure plate 8 cooperate to clamp the slab of material between them. The bed plate 5 carries rigidly bracket arms 9 which in turn support pivotally the middle portion of the arms of a U-shaped frame 10. The U-shaped frame 10 carries pivoted at 11 a plate 12. Plate 12 supports rigidly a plurality of presser arms 13. The pressure plate 8, previously mentioned, is directly connected to the presser arms 13 by means of headed bolts 14. Bolts 14 pass loosely through the presser arms 13 and are rigidly affixed to the pressure plate 8. The heads of the bolts limit the extent of movement which the pressure plate 8 can make away from the presser arms 13. The extent of this lateral movement is sufficient to permit of a considerable amount of play between plate 8 and arms 13. This is necessary with slabs of varying degrees of thickness in order that the entire extent of plate 8 may exert the gripping action upon the slab. The pressure plate 8 is normally maintained in spaced relation to the arms 13 by means of springs 15 which are affixed to the arms 13 and which are adapted to be engaged by one end of pins 16. Pins 16 extend loosely through apertures in the arms 13 and are rigidly affixed to the pressure plate 8. This arrangement of parts permits the application of resilient flexible pressure and also of angular variation of the plate 8 with respect to the bed plate 5.

It will be apparent that it will be necessary when slabs of widely different thicknesses are inserted between the pressure plate 8 and the bed plate 5, to adjust the relative position of the base of the plate 8 with respect to the bed plate. By "base of the pressure plate" is meant the portion thereof next adjacent to the pivots 11. This adjustment is necessary in order that both the base of the pressure plate and the forward portion of the same may exert a pressing action against the slab of rubber material. The adjustment is effected by means of a bolt 17 which has screw threaded engagement with the neck of the U-shaped frame 10 and which bears against a projecting arm 18 rigidly affixed to the bed plate 5.

The pressure plate 8 is normally maintained pressed downwardly against the work by means of a spring 19 which bears at one end against the bed plate 5 and adjacent its opposite end bears against the middle pivot pin 20 of the toggle links 21 which are connected to the bed plate 5 and the plate 12. Sufficient pressure is exerted by the spring 19 to cause the pressure plate 8 to be forced against the bed plate 5 to hold the slab of rubber composition without danger of its slipping out of position. A handle 22 is rigidly affixed to the plate 12. The handle 22 can be manually pressed downwardly against the action of the spring 19 and thereby cause pivotal movement of the plate 12 so as to separate the pressure plate from the bed plate and to permit an article to be positioned therebetween.

A locating piece 23 is rigidly supported by the bed plate 5 adjacent the base of the pressure plate. The locating piece serves as an abutment against which the slab of material can be positioned when inserted in the clamping device. A gauge is positioned laterally of the clamping device and supported upon the main supporting frame 1. It comprises a base 25 mounted upon the main supporting frame 1. An angle bar 26 is supported by the base 25 for adjustable vertical movement by means of a pin and slot connection. Angle bar 26 carries the guide 27 adjustable laterally with respect thereto. This adjustment is effected accurately by means of a bolt 28 which has screw threaded engagement with a flange on the member 27 and which carries a knurled hand-wheel 29. The bolt 28 is mounted for rotatable movement only in a flange projecting from the angle bar 26. The gauge functions to distribute evenly the over flash of rubber composition when the slab is being run through the machine. It also assists in squaring the slab when the latter is being positioned in the clamping device.

Having secured the slab of material in position in the clamping device, the clamping device is manually forced laterally upon the table 3 between the cutting mechanisms whereby the edges are trimmed from the slab of material. The cutting means are supported upon the main supporting frame upon opposite sides of the table 3. The cutting mechanisms on opposite sides of the table 3 are identical in all respects and a detailed description of but one of the mechanisms will be sufficient. It comprises the upright 35 which is secured to the main supporting frame 1 for adjustable lateral movement by means of bolts 36 which pass through elongated slots in the upright 35. The heads of the bolts press against the upright 35 through the medium of the plates 37. Lateral adjustment is effected by loosening the bolts 36, whereupon the rod 38 which has screw threaded connection with the upright 35 is turned by means of the hand wheel 39. Rod 38 is mounted for rotatable movement only with respect to a bracket secured rigidly to the supporting frame 1. Bearing members 40 are supported by the base 35 for adjustment vertically by means of a pin and slot connection. The bearing members 40 support rotatably a shaft 41 which carries rigidly an idler roll 42 which is provided with an annular recess in its periphery. Brackets 43 are supported by the base 35 for vertical adjustment with respect thereto by means of a pin and slot connection. Brackets 43 carry rotatably a spindle 44 which has rigidly secured thereto a circular cutting knife 45. The edge of the cutting knife 45 is adapted to engage with the annular recess of the idler roll 42 and to exercise a shearing and cutting effect when cooperating therewith. The various adjustments previously referred to permit of positioning the knives toward or away from each other so as to sever the required amount of material from the edges of the slab and also permit of raising or lowering the knife 45 and idler roll 42 so as to bring them into proper position vertically to effect the cutting operation. Reservoir 46 is suitably supported from the bracket 43 by means of the arms 47. The reservoir is adapted to contain a suitable lubricant such as water which is conducted to the knife 45 by means of a valved conduit 48. A guard 49 positioned around the knife 45 is suitably supported from the bracket 43. The knife 45 is driven in rotation by means of a belt 50 which passes around a pulley carried by the shaft 44 and around a pulley carried by the driving shaft 51. Shaft 51 is driven by a belt 52 which passes around a pulley rigidly carried by the shaft 51.

Figure 2:
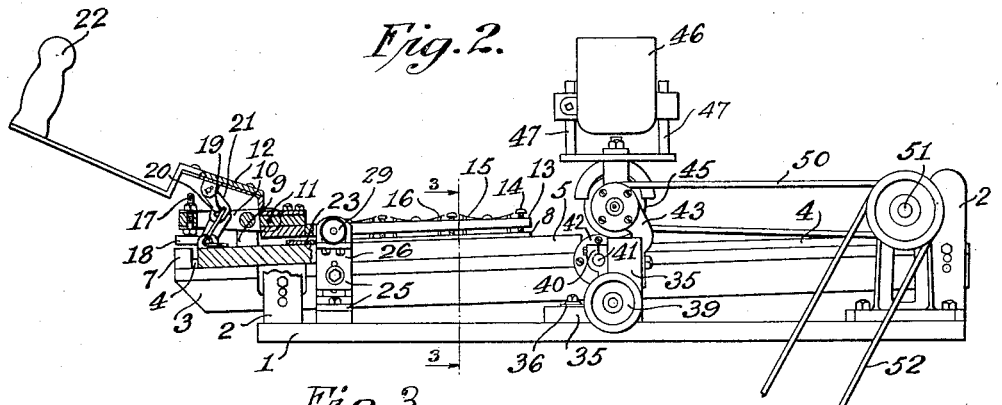
Fig. 2 is a side elevation of the machine with parts broken away.
Figure 3:
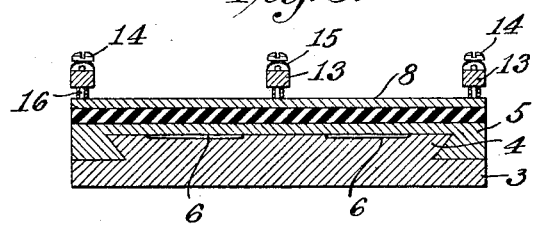
Fig. 3 is a transverse section upon the line 3—3 of Fig. 2.

In the operation of the device, the gauge element 27 is properly adjusted. The pressure plate 8 is elevated with respect to the bed plate 5 by pressing the handle 22 manually downwardly. A slab of material is positioned upon the bed plate 5 abutting against the locating piece 23 and the gauge element 27. The handle 22 is released permitting the pressure plate to be forced by means of the spring 19 into operative position against the slab. Suitable adjustment of the bolt 17 is made to cause the pressure plate 8 to bear against the slab throughout its extent. The knives 45 are caused to be rotated. The clamping device is now passed forwardly from the position illustrated in Figs. 1 and 2 until the entire extent of slab has been passed between the knives 45 during which operation the edges of the slab are severed and dropped upon the main supporting frame 1. Upon completion of the cutting operation, the clamping device is moved back to its original position and the handle 22 is pressed downwardly opening the clamp and the trimmed slab of material is removed.

While the invention has been particularly described as applied to a device for severing slabs of rubber composition, it will be apparent that it can be utilized for trimming any article of sheet material and the claims are to be so understood.

Having thus described my invention, what I claim and desire to protect by Letters Patent is:

1. In a machine for cutting sheet material in combination, cutting mechanism, means for conveying the material past the cutting mechanism whereby the material is cut, means for clamping the material to the conveying means, said clamping means being adjustable relative to the conveying means to accommodate different thicknesses of sheet material.

2. In a machine for trimming sheet material, cutting mechanism, supporting means for the sheet material mounted for movement so as to feed the material to the cutting mechanism, yieldably mounted means mounted on said support and adapted to cooperate therewith to grip the sheet material, yieldable means for forcing the said means together to grip the sheet material, and means for automatically guiding the supporting means whereby it can be conducted past the cutting mechanism and the sheet material severed.

3. A machine for cutting sheet material comprising a cutting device, a support for the material mounted for movement relative to the cutting device to bring the material into engagement with the cutting device, a resiliently pressed member on the support for clamping the material mounted on the support, and means for adjusting the member for accommodating sheet materials of various thickness.

4. A machine for cutting sheet material comprising a cutting device, a support for the material movable relative to the cutting device to bring the material into engagement with the cutting device, a plate adapted to be clamped against the sheet, lever means rotatably mounted on the support, means loosely connecting the plate and the lever means, spring means cooperating with the plate and the lever means whereby the plate is resiliently urged against the sheet by the lever means.

5. A machine for cutting sheet material comprising a cutting device, a support for the material movable relative to the cutting device to bring the material into engagement with the cutting device, a plate adapted to be clamped against the sheet, lever means rotatably mounted on the support, means loosely connecting the plate and the lever means, spring means cooperating with the plate and the lever means whereby the plate is resiliently urged against the sheet by the lever means, and means for adjusting the lever means so as to accommodate sheets of various thickness.

6. A machine for cutting sheet material comprising a cutting device, a support for the material movable relative to the cutting device to bring the material into engagement with the cutting device, a plate adapted to be clamped against the sheet, lever means rotatably mounted on the support, means loosely connecting the plate and the lever means, spring means cooperating with the plate and the lever means whereby the plate is resiliently urged against the sheet by the lever means, means for adjusting the lever means so as to accommodate sheets of various thickness, and a spring acting on the lever means to clamp the sheet material.

Signed at Cleveland, county of Cuyahoga, State of Ohio, this 25th day of October, 1927.

WILLIAM J. KENT.